United States Patent [19]
Moffitt et al.

[11] Patent Number: 5,105,332
[45] Date of Patent: Apr. 14, 1992

[54] CAPACITOR NETWORK FOR COAXIAL CONNECTOR

[75] Inventors: Peter Moffitt, Mid Sapphire, Australia; Young B. Kim, La Habra Heights, Calif.

[73] Assignee: Quotron Systems, Inc., Los Angeles, Calif.

[21] Appl. No.: 595,280

[22] Filed: Oct. 9, 1990

[51] Int. Cl.⁵ .......................... H01G 4/00; H03H 7/01
[52] U.S. Cl. ...................................... 361/301; 333/181
[58] Field of Search .............. 361/301, 306; 333/24 C, 333/181, 182, 183

[56] References Cited

U.S. PATENT DOCUMENTS

| | | | |
|---|---|---|---|
| 2,983,855 | 5/1961 | Schlicke | 333/182 X |
| 3,613,033 | 10/1971 | Denes | 333/182 |
| 4,611,185 | 9/1986 | Dirmeyer et al. | 333/181 X |

FOREIGN PATENT DOCUMENTS 2906825 9/1980 Fed. Rep. of Germany .

*Primary Examiner*—Donald A. Griffin
*Attorney, Agent, or Firm*—Christie, Parker & Hale

[57] ABSTRACT

A field installable capacitor network assembly screws onto an externally threaded coaxial connector and makes contact with signal ground. The network assembly also makes a reliable low impedance contact with the chassis wall as it screws toward the coaxial connection, using protrusions extending from rear face of the network assembly to cut through any insulating coat covering of the chassis wall and make contact with the wall. A small capacitor inside a defined region of an annular body of insulating material secured between two sleeve shaped conductors respectively in contact with the connector and the chassis wall makes an electrical connection between these surfaces.

7 Claims, 1 Drawing Sheet

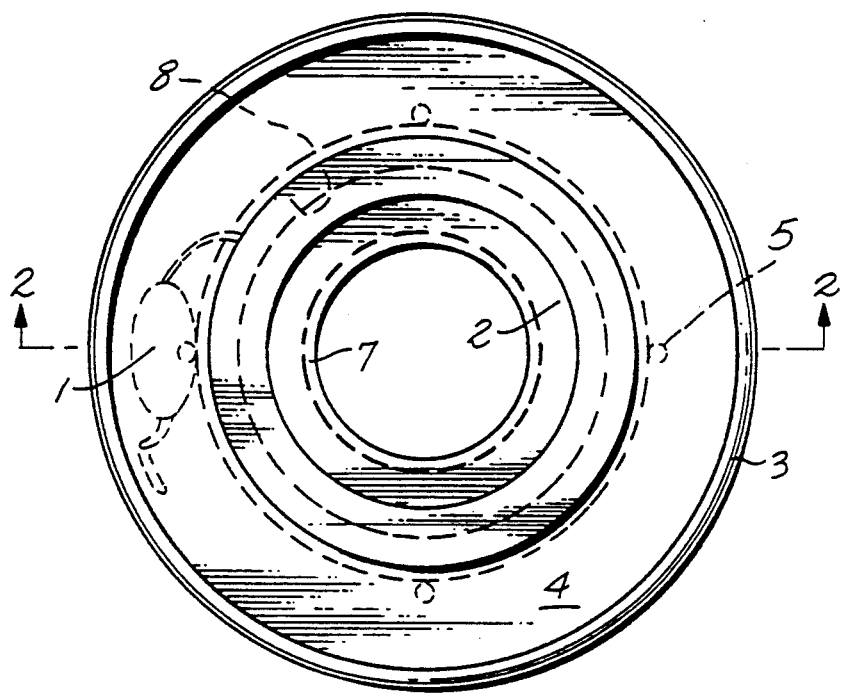
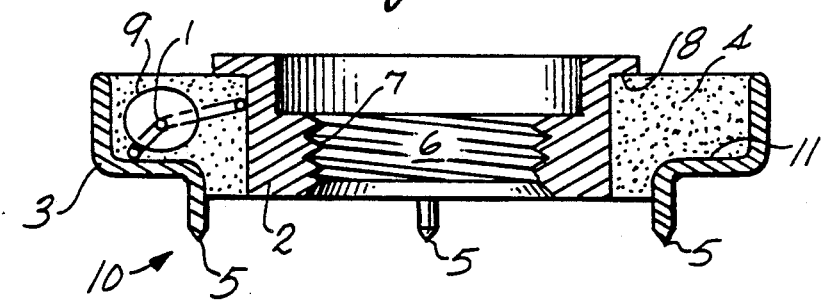

CAPACITOR NETWORK FOR COAXIAL CONNECTOR

BACKGROUND OF THE INVENTION

This invention relates generally to capacitor network assemblies having means for reducing radio frequency interference (RFI) effects.

It is well known that electrical devices must be protected from interference caused by radio frequencies. The presence of radio frequencies cause interference with the displayed image which may result in ghost images and other image problems which affects job performance.

Additionally, the FCC has strict limitations on permissible levels of radiation for each class of device. By using a field installable capacitor network assembly, manufacturers can efficiently and cost effectively eliminate or at least diminish the likelihood of excessive radio frequency emissions.

U.S. Pat. No. 4,242,655 describes a specially designed RF connector to block DC and low frequency currents between two devices. A uniformly distributed capacitance is used to block the flow of these currents. The capacitance is sandwiched between two metal washers in which a flat washer is in electrical contact with the chassis wall.

U.S. Pat. No. 4,229,714 describes a RF coaxial connector assembly having a washer-like capacitor fitted outside the outer conductor and a transformer is employed to reduce RFI emissions.

SUMMARY OF THE INVENTION

According to the present invention, there is provided a field installable capacitor network assembly which offers a simple and relatively low-cost means of reducing RFI in order to comply with FCC regulations and to eliminate or at least diminish the likelihood of excessive radio frequency emissions. The fact that the capacitor network assembly in accordance with the invention can be installed retroactively reduces repair costs to the manufacturers and downtime costs to the purchasers.

The field installable capacitor network assembly preferably comprises an annular insulating body secured between two conductive metallic sleeves. One of the conductors is threaded thereby enabling the network assembly to be screwed onto a coaxial connector. The other conductor has a plurality of sharp protrusions which extend rearwardly. A small capacitor contained within a receiving cell defined in the insulating body electrically connects the two conductors.

When the network assembly is screwed tightly onto a threaded coaxial connector, the internally threaded conductor is securely grounded to the signal ground. As the network assembly is rotated about the coaxial connection and is drawn towards the chassis by the threaded inner conductor, the rearwardly facing protrusions are able to cut through even a relatively thick insulating cat adhering to the chassis wall in the vicinity of the coaxial connector and make contact therewith. Since the capacitor in he insulating material is electrically connected to the two conductors, a signal path through the capacitor is created which provides a capacitive connection between chassis ground and signal ground and thereby reduces RFI emissions.

BRIEF DESCRIPTION OF THE DRAWINGS

Other objects and features of the present invention will be apparent from the following description of a presently preferred embodiment taken in connection with the accompanying drawings, in which:

FIG. 1 shows a plan view of the front face of the field installable capacitor network assembly.

FIG. 2 is a sectional view of the field installable capacitor network assembly.

DETAILED DESCRIPTION OF THE PREFERRED EMBODIMENT

The field installable capacitor network assembly shown in FIG. 1 comprises a 0.01 $\mu$F capacitor 1 electrically coupled between a generally sleeve-shaped inner metal conductor 2 and a generally sleeve-shaped outer metal conductor 3. Each of the sleeves may be conventionally formed from brass, with a chrome coating. The capacitor 1 is embedded inside a defined region of an insulating material 4 such as Teflon (registered trademark).

The inner metal conductor 2 makes contact with signal ground when it is screwed onto the mating threads of a coaxial connector protruding from the device to be protected (not shown). The outer metal conductor 3 makes contact with chassis ground of the protected device, when the protrusions 5 (shown in FIG. 2) make contact with the grounded wall through which the coaxial connector protrudes.

FIG. 2 shows a sectional view of the capacitive network assembly of FIG. 1. In the center hole 6 there is provided a screw means 7 for making a mechanical and electrical connection with the external threads of the coaxial connector. In the illustrated preferred embodiment, the screw means 7 comprises an internally threaded portion of the generally sleeve-shaped inner metal conductor 2, which is additionally provided with an outwardly extending front lip 8 which defines at least part of the front face of the assembly.

The capacitor 1 is contained in a receiving cell 9 defined within the annular body of insulating material 4 and electrically connects the screw means 7 and a prong means 10 for making a reliable low impedance electrical contact with the chassis wall. The prong means 10 is preferably integral with the generally sleeve-shaped outer metal conductor 3, which is preferably knurled about its outer circumference to facilitate installation without any special tools. More generally, prong means 10 may include one or more of the above-mentioned plurality of sharp conductive protrusions 5 which are preferably oriented perpendicular to the rear face of the network assembly and symmetrically arranged with respect to the center of hole 6. In the event that there are any insulating bushings or other mounting hardware surrounding the threaded portion of the coaxial connector in the vicinity of the chassis wall, the protrusions should be sufficiently long and at a sufficient radial distance from the connector to make contact directly with the chassis wall without any interference from such hardware. The outer conductor 3 preferably also has an inwardly extending lip 11 which, in cooperation with the outwardly extending lip 8 of the inner sleeve 2, secures the insulating material between the two conductors. The thus-secured body of insulating material 4 transfers rotational forces from the outer sleeve 3 to the inner sleeve 2 and the resultant axial forces from the inner sleeve 2 to the outer sleeve 3. When the network assembly is rotated clockwise about the coaxial connection, the outer sleeve 6 is thus drawn towards the chassis and the protrusions 5 scrape off any paint, debris or other non-conductive material coating the chassis wall and thereby make a secure, reliable contact with said wall. Hence, radio frequencies are bypassed to a ground reference thereby reducing or eliminating RFI emissions.

While the invention has been shown and described with reference to a presently preferred embodiment, it is understood by those skilled in the art that numerous changes in form and detail may be made therein without departing from the scope of the invention.

We claim:

1. A field installable capacitor network assembly for providing capacitance between an externally threaded coaxial connector protruding from a conductive chassis wall, said assembly comprising:
   an internally threaded screw means for securing said assembly about the external threaded portion of said connector to thereby propel said assembly towards the chassis wall as the screw means is rotated in a predetermined direction about the connector while maintaining a first direct electrical connection with said connector;
   a rearwardly projecting prong means for removing any insulating coat covering said chassis wall covering as said screw means is rotated in said predetermined direction, to thereby establish a second direct electrical contact with said wall; and
   a capacitor electrically coupled between the first direct electrical connection and the second direct electrical connection.

2. A field installable capacitor network assembly as recited in claim 1 wherein the screw means comprises an inner metal conductor having an internally threaded center hole for screwing onto the externally threaded connector and an outwardly facing lip defining at least a central portion of a front surface of the assembly.

3. A field installable capacitor network assembly as recited in claim 2 wherein the prong means comprises at least a circumferential portion of the rear face of said network assembly.

4. A field installable capacitor network assembly as recited in claim 1 wherein the prong means comprises a plurality of sharp metallic protrusions extending rearwardly from said network assembly.

5. A field installable capacitor network as recited in claim 1 wherein the capacitor is embedded inside a defined region of an insulating material separating the screw means from the prong means.

6. A capacitor network assembly comprising:
   an inner metal sleeve having an front lip extending outwardly from an internally threaded center, the inner and front surfaces of the inner sleeve thereby defining at least a portion of the inner circumference and front face of the assembly respectively;
   an outer metal sleeve surrounding the inner metal sleeve and having a rear lip extending inwardly from a knurled outer circumference provided with a plurality of rearwardly extending sharp ended protrusions, the outer and rear surfaces of the outer sleeve thereby defining at least a portion of the outer circumference and rear face of the assembly respectively;
   an insulating body between the inner sleeve and the outer sleeve for providing electrical isolation between the two sleeves; and
   a capacitor embedded inside a defined region of said insulating material and electrically connected between said inner and outer metal sleeves.

7. A capacitor network assembly as recited in claim 6, wherein said insulating body is mechanically secured to the two sleeves so as to transfer rotational forces from the outer sleeve to the inner sleeve and to transfer axial forces from the front lip to the rear lip; whereby when the network assembly is placed over a coaxial connector protruding from a metallic chassis wall covered by an insulative coating and the outer sleeve is rotated in a predetermined direction, the inner sleeve is screwed onto the coaxial connector and a rearward force is applied to the rotating protrusions to cause them to cut through the insulative coating and make a low resistance electrical contact with the chassis wall.

* * * * *

UNITED STATES PATENT AND TRADEMARK OFFICE
CERTIFICATE OF CORRECTION

PATENT NO. : 5,105,332

DATED : April 14, 1992

INVENTOR(S) : Peter Moffitt; Young B. Kim

It is certified that error appears in the above-identified patent and that said Letters Patent is hereby corrected as shown below:

COL. 1     LINE 61     Change "cat" to —coat—

COL. 1     LINE 63     Change "he" to —the—

Signed and Sealed this

Nineteenth Day of October, 1993

Attest:

BRUCE LEHMAN

*Attesting Officer*     *Commissioner of Patents and Trademarks*